March 24, 1931.   G. F. THOMAS   1,797,277
LUBRICATING APPARATUS
Filed July 22, 1927
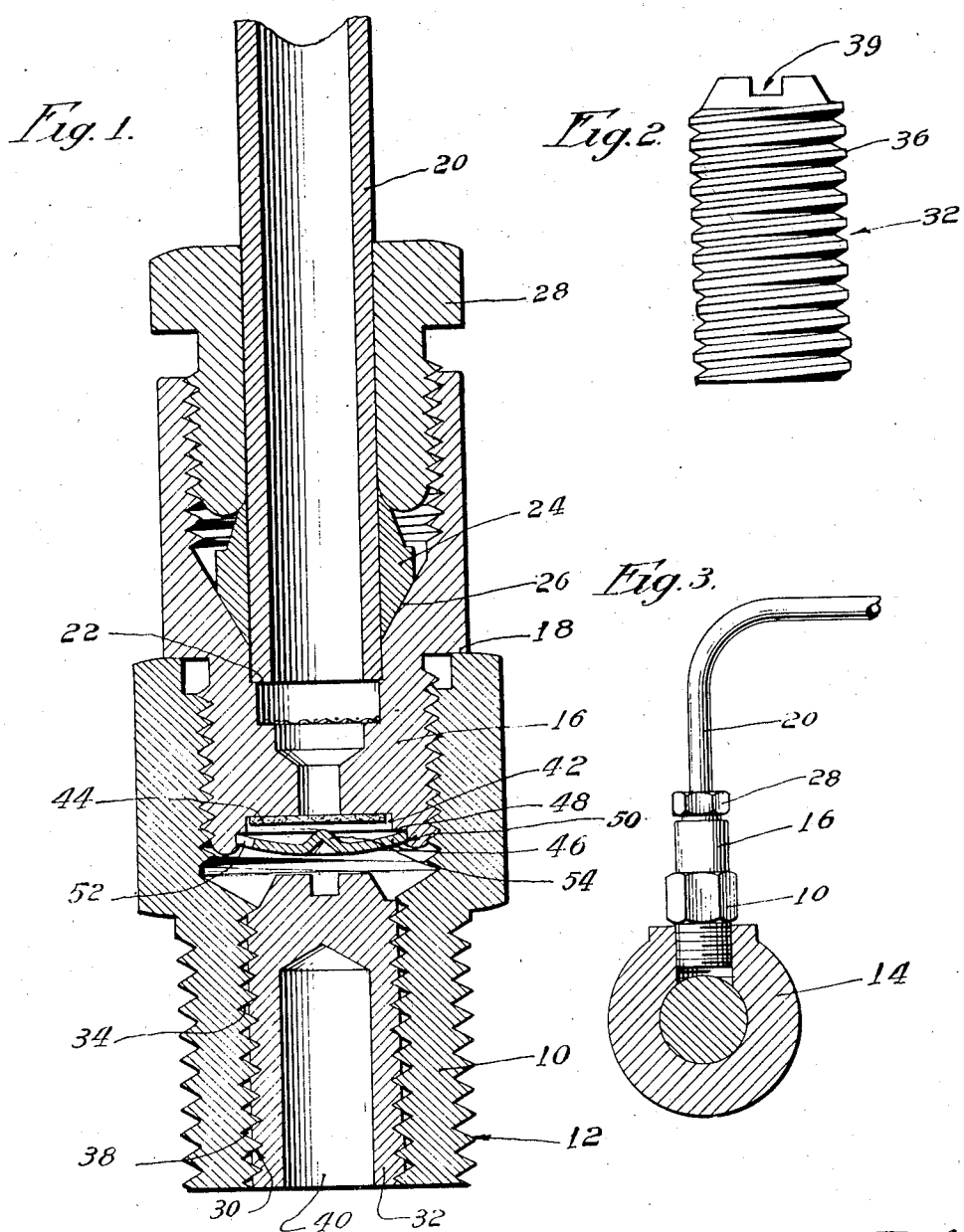
Inventor:
George F. Thomas.
By: Williams, Bradbury,
McColes & Hinkle
Atty's.

Patented Mar. 24, 1931

1,797,277

UNITED STATES PATENT OFFICE

GEORGE F. THOMAS, OF BERWYN, ILLINOIS, ASSIGNOR TO ALEMITE CORPORATION, OF CHICAGO, ILLINOIS, A CORPORATION OF ILLINOIS

LUBRICATING APPARATUS

Application filed July 22, 1927. Serial No. 207,631.

My invention relates to lubricating apparatus, and is more specifically concerned with the resistance units for controlling the flow of lubricant to the bearings lubricated by a centralized lubricating system.

Lubricating systems of the so-called centralized type comprise in general a lubricant reservoir or other source of supply, pumping means for forcing the lubricant from the reservoir to the bearings to be lubricated, conduits connecting the pump with the bearings, and resistance units or other control devices placed adjacent the bearings to be lubricated and serving to regulate the amount of lubricant supplied thereto. It is to resistance units of this type that my invention relates.

In making such resistance units, it has heretofore been the practice to provide a sleeve with a substantially cylindrical bore therethrough and a resistance plug located in said bore and adapted to provide a restricted passage-way through which the lubricant must pass. In some instances the resistance plug has been provided with a spiral groove which co-operates with the bore of the sleeve to provide a long, narrow passage-way through which the lubricant flows. The latter type of resistance unit has the disadvantage that the spiral wall between convolutions of the groove is subjected to bending and distorting forces when the plug is driven into the sleeve, with the result that the wall is frequently so distorted as to close the passageway, thereby rendering the unit useless.

Attempts have been made to overcome this defect by tapering the wall of the sleeve and the resistance plug, and it has also been suggested that the body of the resistance plug be made so frail as to crush slightly when driven home in the tapered bore of the sleeve, the crushing of the body of the resistance plug serving to reduce the strain on the wall and thus prevent deformation thereof. These expedients have not proved wholly satisfactory and it is an object of my invention to provide a new and improved resistance unit which eliminates the source of the trouble.

Another object is to provide a new and improved resistance plug.

Another object is to provide a resistance unit in which the plug is screwed into place instead of being driven into its surrounding sleeve.

Another object is to provide a resistance unit which can be assembled without danger of obstructing the passageway therethrough.

Another object is to provide a resistance unit having a spiral passage-way therethrough and which is free from the defects of the present units.

Another object is to provide a new and improved method of assembling resistance units.

Other objects and advantages will appear as the description progresses.

In the drawings:

Figure 1 is a longitudinal section of my new and improved resistance unit on an enlarged scale;

Figure 2 is an elevation of my novel resistance plug on the same scale as Figure 1; and Figure 3 shows my resistance unit secured to a bearing, the latter being shown in cross section.

Referring to the drawings, my resistance unit comprises a terminal sleeve 10 having pipe threads at 12 for securing it to a bearing, such as indicated at 14 in Figure 3. An intermediate sleeve 16 is threaded to the terminal sleeve 10 by machine threads, an abutment shoulder being provided at 18. The sleeve 16 receives the end of the conduit 20 which abuts a stop 22, and is clamped in place by the clamping ring 24 pinched between a conical surface 26 on the sleeve 16 and the end of the clamping nut 28.

The lower portion of the terminal sleeve 10 is provided with an interiorly threaded cylindrical part 30, in which is located my novel resistance plug 32. The interior threads 34 of the part 30 may be of any desired shape, but are preferably standard V-shaped threads, as shown in the drawing. The cylindrical resistance plug 32 is provided with partial threads 36 which co-operate with the threads 34 to provide a restricted spiral passage 38 through which the oil must pass. The threads 34 and the partial threads 36 may have such relationship as to provide any desired size of passage-way. The resistance plug is also provided with a kerf 39 for cooperating with a screwdriver or similar tool in assembling said plug and its co-operating sleeve. The plug 32 may be drilled as at 40 to remove excess material and thus recover the value thereof.

Above the plug 32 and in a pocket 42 in the lower end of the intermediate sleeve 16, I locate a check valve, which in the present instance, comprises a disc 44 of empire cloth or other suitable material, and a limiting washer 46 which rests against a shoulder 48 and is held in place by the swaged end 50 of the sleeve 16.

The disc 44 is normally maintained in the position shown in Figure 1 by the capillary attraction of the oil, and thus serves as a check valve to prevent back-flow of the oil from the bearing to the conduit. When pressure is applied to the oil in the conduit 20, one side of the disc 44 is moved away from the end of the sleeve 16, thus permitting the oil to pass from the conduit to the upper side of the washer 46, thence through the openings 52 and the restricted passage 38 to the bearing. The washer 46 is provided with an upstanding projection 54 which limits the movement of the disc 44 and insures the return of this disc to its initial position by the capillary action of the oil when the pressure on the oil in the conduit 20 ceases.

It is to be understood that the restricted passage between the plug and the terminal sleeve may be made of any size and length to provide any desired resistance. The resistance may also be varied by regulating the extent to which the plug is screwed into the terminal sleeve.

In assembling my new and improved resistance unit, the terminal sleeve and the resistance plug form one sub-assembly and the intermediate sleeve and the check valve form a second sub-assembly. In assembling the resistance plug in the terminal sleeve, the sleeve is first gripped and held firmly, then the resistance plug is placed adjacent the sleeve and the kerf interlocked with a screwdriver or similar tool, and finally the screwdriver or other tool is rotated and moved axially so as to screw the resistance plug into the terminal sleeve for the desired distance.

The sub-assembly thus formed is then screwed onto the end of the intermediate sleeve 16, in the pocket of which has been placed a disc 44 and a washer 46, the latter being firmly held in place by the swaged end 50 of the sleeve 16. Thereafter the unit may be secured to a conduit by inserting the end of the conduit into the sleeve 16 and screwing down a clamping nut 28 so that it compresses the clamping ring 24 and jams it firmly against the conduit.

Having thus explained my invention, what I claim and desire to secure by Letters Patent is:

1. In a lubricating system of the class described, a resistance unit comprising, in combination, a cylindrical sleeve-like conduit member, and a cylindrical resistance plug threadedly secured therein, said conduit member having V-shaped threads and said resistance plug having partial V-shaped threads, said V-shaped threads and said partial V-shaped threads co-operating to provide a spiral lubricant passage way therebetween.

2. In a lubricating system, a resistance unit comprising, in combination, a threaded sleeve-like member, and a threaded resistance plug, the threads on the plug being different from the threads on the sleeve-like member, both sets of threads co-operating to provide a spiral passage-way therebetween through which lubricant may pass.

3. In a lubricating system, a resistance unit comprising, in combination, a conduit member a second member threaded therein, the threads on the two members being of different conformation to provide a spiral lubricant passageway therebetween.

4. In a lubricating device, a resistance unit comprising in combination a threaded sleeve-like member, and a threaded resistance plug, said sleeve-like member having V-shaped threads and said resistance plug having partial V-shaped threads, said V-shaped threads and said partial V-shaped threads cooperating to provide a spiral passageway therebetween.

In witness whereof I hereunto subscribe my name this 30 day of March, 1927.

GEORGE F. THOMAS.